United States Patent

[11] 3,550,625

| [72] | Inventor | William Ray Adams, Jr. |
| | | Rte. 2 Box 321, Chester, Va. 23831 |
| [21] | Appl. No. | 736,741 |
| [22] | Filed | June 13, 1968 |
| [45] | Patented | Dec. 29, 1970 |

[54] PURGE VALVE
10 Claims, 5 Drawing Figs.

[52] U.S. Cl............................................. 137/614.2,
137/454.5; 251/61.4, 251/145
[51] Int. Cl............................................. F16k 31/145
[50] Field of Search.......................................... 251/145,
144, 61.4, 146; 137/454.5, 614.2

[56] References Cited
UNITED STATES PATENTS
| 986,754 | 3/1911 | Podhajsky | 137/614.2X |
| 1,148,456 | 7/1915 | Kenney | 251/144X |
| 1,205,619 | 11/1916 | Hansen | 251/144X |
| 3,347,267 | 10/1967 | Inman | 251/146X |

Primary Examiner—M. Cary Nelson
Attorney—Roy H. Massengrill

ABSTRACT: A valve adapted for installation in a pipeline or vessel to facilitate the injection or removal of a fluid in a closed system employed primarily for the purpose of conveying highly viscous materials or polymeric materials which have a tendency to form solid masses in static areas. A seating arrangement which is flush with the interior wall of said pipeline or vessel prevents the material in said system from becoming stagnant in the area adjacent to the valve seat thereby obviating a plugged condition that would occur otherwise. The valve may be provided with a second valve internally thereof which functions as a check valve to prevent backflow.

PATENTED DEC 29 1970

INVENTOR:

BY *Patrick L. Henry*

ATTORNEY

PATENTED DEC29 1970

INVENTOR:

BY Patrick L. Henry

ATTORNEY

PURGE VALVE

BACKGROUND OF THE INVENTION

In the chemical processing industry complex systems comprised of vast amounts of piping and vessels interconnected to form enclosed fluid systems are employed to convey a variety of materials. Quite often the materials processed in these enclosed fluid systems are monomeric materials that will polymerize if permitted to accumulate in a static condition thereby causing plugging. Periodically, the operation of these systems must be temporarily shut down because of process changes or maintenance. Since the piping must be cleared of potentially explosive or other unwanted materials it is essential to provide means for purging the system.

There are other processes wherein the injection of material into a system and/or the removal of material therefrom is required. In all of these operations it is highly desirable that the means employed be permanently installed.

Generally, the injection or withdrawal of material is facilitated through an opening in the piping wall having a threaded boss or the like mounted therein to receive a nipple or coupling for installing a shut-off valve such as a gate-type valve. The valve is provided with connection means for connecting the purging or extraction system thereto. Typically these valves are positioned a short distance from the pipe thereby leaving a static area between the gate or seal means of said valve and the flow area inside of the pipe. Thus, the material being processed may either deteriorate or crystallize thereby resulting in contamination of the entire system or the freezing or plugging of the valve.

SUMMARY OF THE INVENTION

The principle object of the present invention is to provide a valve for installation in a primary system to facilitate the transfer of a fluid material between said primary system and a secondary system wherein the valve seat is flush with the inside wall of piping or other enclosure comprising the primary system so that a "pocket" or static area is not formed.

The valve of this invention is comprised of an elongated housing having a stem extending longitudinally through said housing. A valve seat is mounted at the end of the housing to accommodate a frustoconical plug carried on one end of the stem. The other end of the valve stem is connected to an actuator means for reciprocating the valve stem to accomplish an open or closed position of the valve. The actuator may be a manual operator or a motor operator which may be detachable if desired. Preferably the valve is biased closed by a conventional compression spring and opened by a pneumatically operated motor of a well-known type. The housing is provided with an inlet and central passageway to provide communication between said inlet and the valve seat. Also, the valve must be provided with suitable means to facilitate installation wherever desired.

The valve seat may face toward or away from the valve stem actuating means. Where the seat faces toward the actuator a skirt-guided plug is preferred for reasons to be explained later herein.

Additionally, the valve may be provided with means to prevent the entrainment of material from the primary system with material in the secondary system through an operator error or caused by greater pressure from the primary system. The stem of the valve may be provided with a slidable plug member which is spring biased against a seat or forced against a seat by hydrostatic flow to prevent flow from the primary system to the secondary system under purging or other type injection conditions.

PREFERRED EMBODIMENTS

Figure 1:
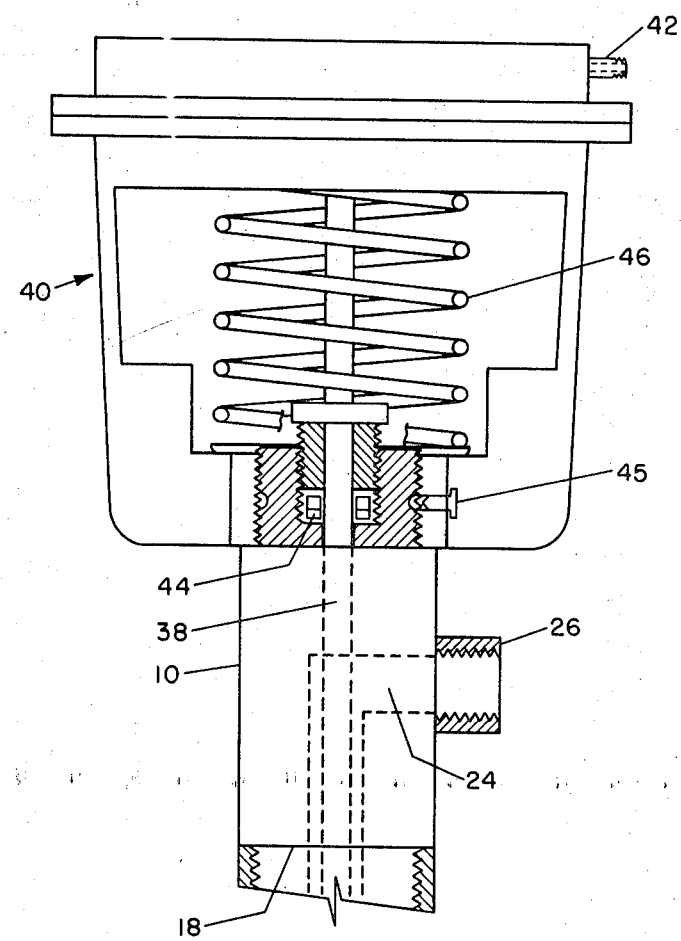
FIG. 1 is a view in vertical partially shown in cross section of a preferred embodiment of the invention illustrating the valve in an open position installed on a section of pipe. An intermediate section of the valve body is removed for convenience in illustrating the details of the invention.
Figure 1:
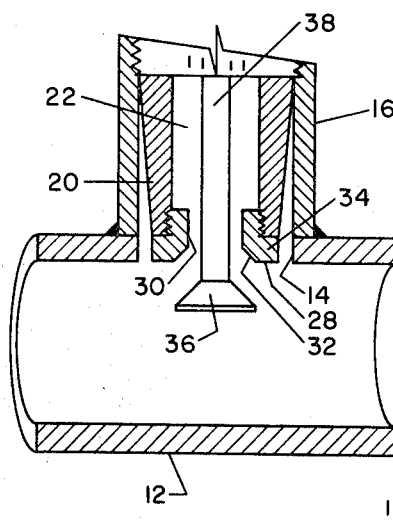

The drawings illustrate five preferred embodiments of the present invention of which FIG. 1 illustrates the basic embodiment and FIGS. 2—5 show modified forms thereof. Now with more specific reference to the drawings wherein like numerals refer to the same parts throughout the various views thereof, a valve body 10 is shown connected to a main pipe 12. The pipe 12 is provided with an access hole 14 having a cylindrical coupling 16 welded thereto which surrounds the hole 14. The inside diameter of the coupling 16 is provided with standard screw threads to receive the valve body 10 which has matching threads on the outside diameter of an intermediate section of the valve. The valve body 10 may be provided with a shoulder 18 for the coupling 16 to abut against, if desired, although a stop means is not essential.

The lower portion of the valve body is tapered to facilitate installation and removal of the valve within coupling 16. A passageway 22 extending throughout the length of the tapered and threaded portions of the valve body 10 connects with inlet 24 to provide communication from a secondary system, not shown, and the primary system, represented by pipe 12. An inlet connection 26 is mounted on the valve body for connecting to the secondary system. Communication through the passageway 22 is controlled by a valve arrangement located on the end of the tapered portion 20.

An insert 28 having a bore 30 therein is screwed into the tapered valve body until the flanged portion 34 abuts against the end of said tapered body. The bore 30 is machined to provide a frustoconical seat to accommodate the frustoconical head portion 36 carried on stem 38 which extends through the cavity of valve body 10 to a pneumatically operated motor 40 which reciprocates the plug or head 36 into an open or closed position. A seal is achieved when the valve is in a closed position. The valve motor 40 is a conventional diaphragm-type element which is operated by a pneumatic pressure source, not shown, connected to the inlet fitting 42. A conventional seal means 44 prevents leakage around the stem 38. Reciprocation of the valve stem 38 to open and close the valve is accomplished by the operation of the diaphragm element, not shown, in conjunction with a compression spring 46.

Figure 2:
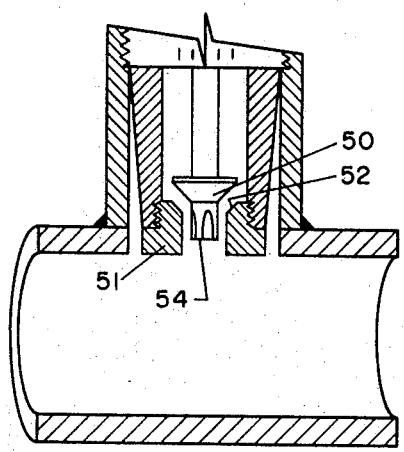
FIG. 2 is a cross section of a modification of the valve seating arrangement wherein the seat faces from the pipe and the plug is provided with a fluted extension which prevents pluggage or blockage of the access hole.

Referring to FIG. 2 there is shown a modification of the seating arrangement of the valve closure means wherein the closure means 50 and seat 52 are located internally of the lower portion of the valve body. The plug 50 is provided with a fluted extension 54 which extends to the end of the valve housing when the valve is closed. The extension element functions as means for preventing material to crystallize or otherwise set up in the portion of the passageway extending through the seating element 51. As the plug 50 is retracted to open the valve, the fluted areas of extension element 54 withdraw from the solid mass of material to provide a flow path.

Figure 3:
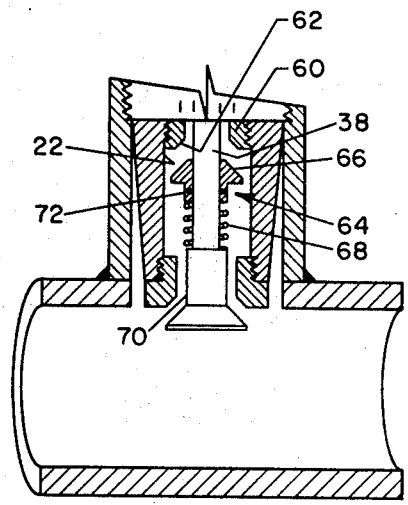
FIG. 3 is a cross section of another modified form of the valve of FIG. 1 wherein the stem is provided with a spring-biased slidable sleeve member having a conical-shaped plug on one end which seats on a frustoconical surface in an insert retained within the cavity of the valve body housing.

FIG. 3 illustrates the valve closure means of FIG. 1 having a second valve means located internally in the valve body to prevent backflow. The closure means which is capable of sealing, is comprised of a cylindrical insert element 60 retained in the valve passageway 22. Element 60 is provided with a frustoconical seat 62. A slidable-sleeve element 64 having a conical shaped head 66 on one end thereof facing seat 62 is mounted on valve stem 38. The slidable element is spring biased against the seat to provide a seal via a spring 68 supported by a shoulder 70. The spring should be relatively weak so that it may be overcome easily by pressure exerted from the secondary system discussed hereinbefore. An O-ring 72 is provided to prevent leakage around the valve stem 38.

Figure 4:
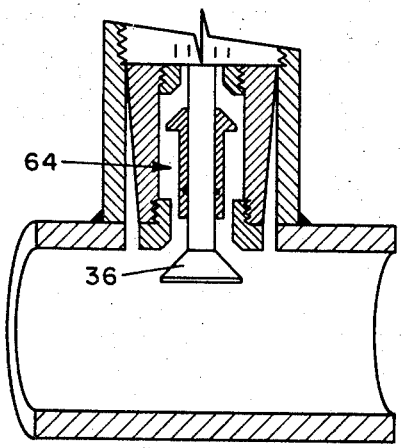
FIG. 4 is a cross section of a slightly modified form of the check valve shown in FIG. 3 illustrating the slidable plug without a biasing spring.

The valve seating arrangement shown in FIG. 4 functions in the same manner as FIG. 3 except the slidable element 64 is a float-type valve controlled by the differential pressure which may be imposed thereon. The element must be shorter than the distance between the two seats to permit closure of the primary valve plug 36.

Figure 5:
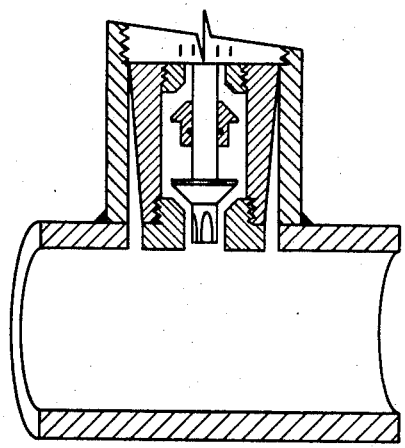
FIG. 5 is a cross section of a modification of the valve shown in FIG. 2 wherein the stem is provided with a slidable sleeve element having a conical-shaped plug on an end thereof which is capable of seating on an insert retained in the cavity of the valve housing to form a seal that prevents back flow of material.

FIG. 5 is a modification of the embodiment shown in FIG. 2 wherein the valve is provided with a secondary float valve of the type employed for the embodiment represented in FIG. 3 or 4.

The valve and several modifications thereof may be constructed from various metals or suitable plastic materials. Preferably the interior elements which are exposed to the liquids or fluids being conveyed by said valves are constructed from a corrosion-resistant material. These valves may be permanently installed in piping systems where purging or evacuation of the system is required. Usually wet steam is employed but sometimes other fluids are preferred. The valves may be controlled automatically when installed in unaccessible areas such as nuclear reactor systems, or may be locally controlled by manual operation.

While the valve of this invention has been described primarily in connection with a purging operation, it will be recognized for its utility in other applications such as the injection of additives into a closed system or the withdrawal of samples. Thus, a principle feature of the invention resides in the simple construction of the valve which provides prolonged service without encountering blocked or plugged conditions that occur frequently with the conventional valves. Those expert in the trade will also recognize that another important aspect of the invention is the slidable float valve that prevents material from escaping the primary system when this is desirable.

I claim:

1. A valve having an elongated body adapted for use, in combination, with a pipe and the like, said pipe having an access opening in the wall thereof, a coupling mounted on the pipe concentrically of the access opening, means for connecting the valve body to the coupling, a portion of said valve body being retained within said coupling, said portion being tapered to facilitate removal thereof from said coupling, a first passage extending longitudinally within the valve body, a second passage extending through one wall of the valve body and joining the first passage to provide inlet communication from a source intermediate said valve body and the pipe, a valve seat mounted in the first passage adjacent the end of the valve body attached to the pipe, a reciprocable valve stem extending longitudinally throughout the length of the valve body, said stem having one end connected to an actuating means for reciprocation thereof and having an enlarged portion on the other end capable of producing a seal when biased against the seat, and seal means located between the first passage and the actuating means to prevent leakage around the valve stem.

2. The valve as described in claim 1 wherein the enlarged portion is flush with the inside diameter of the pipe when seated.

3. The valve as described in claim 2 wherein the enlarged portion extends into the pipe when the bias against the stem is overcome.

4. The valve as described in claim 1 wherein the seat is located internally of the first passage facing away from the pipe.

5. The valve as described in claim 4 wherein the enlarged portion is provided with a fluted extension that extends at least to the inside diameter of the pipe wall when said portion is in contact with the seat.

6. The valve as described in claim 1 wherein the valve body is connected to the coupling by screw threads.

7. The valve as described in claim 1 wherein the actuating means is operated pneumatically.

8. A valve having an elongated body adapted for use, in combination, with a pipe and the like, said pipe having an access opening in the wall thereof, means for connecting the valve body to the pipe within the access opening, a first passage extending longitudinally within the valve body, a second passage extending through one wall of the valve body and joining the first passage to provide inlet communication from a source intermediate said valve body and the pipe, a first seat mounted in the first passage adjacent the end of the valve body attached to the pipe, a reciprocable valve stem extending longitudinally throughout the length of the valve body, said stem having one end connected to an actuating means for reciprocation thereof and having an enlarged portion on the other end capable of producing a first seal when biased against said first seat, seal means located between the first passage and the actuating means to prevent leakage around the valve stem, and a second valve slidably mounted on said valve stem for movement against a second seat independent of movement of said first valve to provide a second seal.

9. The valve as described in claim 8 wherein the second valve is comprised of a slidable element mounted on the valve stem, said element having a conical-shaped plug thereon, and a mating seat retained in the first passage to accommodate said plug to provide a seal when in contact therewith.

10. The valve as described in claim 9 wherein the slidable element is spring-biased against said seat.